(12) United States Patent
Kobayashi

(10) Patent No.: US 10,983,635 B2
(45) Date of Patent: Apr. 20, 2021

(54) CONTROL PARAMETER ADJUSTMENT DEVICE

(71) Applicant: FANUC CORPORATION, Yamanashi (JP)

(72) Inventor: Youhei Kobayashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/752,715

(22) Filed: Jan. 27, 2020

(65) Prior Publication Data

US 2020/0241691 A1 Jul. 30, 2020

(30) Foreign Application Priority Data

Jan. 30, 2019 (JP) .............................. JP2019-014499

(51) Int. Cl.
*G06F 3/041* (2006.01)
*G06N 20/00* (2019.01)
*G06F 3/044* (2006.01)

(52) U.S. Cl.
CPC ............ *G06F 3/0418* (2013.01); *G06F 3/044* (2013.01); *G06N 20/00* (2019.01)

(58) Field of Classification Search
CPC ...... G06F 3/0393; G06F 3/0418; G06F 3/044; G06F 3/017; G06F 3/041; G06F 3/0416; G06F 3/04166; G06F 3/046; G06F 2203/04101; G06F 2203/04106; G06N 20/00
See application file for complete search history.

(56) References Cited

U.S. PATENT DOCUMENTS

| | | | |
|---|---|---|---|
| 2016/0216794 A1* | 7/2016 | Yoon | G06F 3/0418 |
| 2018/0204111 A1* | 7/2018 | Zadeh | G06K 9/3233 |
| 2020/0103980 A1* | 4/2020 | Katz | G06F 3/167 |

FOREIGN PATENT DOCUMENTS

| | | |
|---|---|---|
| JP | 2012094079 A | 5/2012 |
| JP | 2016058047 A | 4/2016 |
| JP | 2016200886 A | 12/2016 |

* cited by examiner

*Primary Examiner* — Nelson M Rosario
(74) *Attorney, Agent, or Firm* — Hauptman Ham, LLP

(57) ABSTRACT

A control parameter adjustment device acquires at least data related to a control parameter including a control parameter set for a capacitance type touch panel device and data related to external noise detected when the capacitance type touch panel device is not touched, generates learning data used in machine learning based on the acquired data, and based on the learning data, performs a machine learning process related to adjustment of the control parameter of the capacitance type touch panel device in an environment in which the data related to the external noise is acquired.

8 Claims, 5 Drawing Sheets

CONTROL PARAMETER ADJUSTMENT DEVICE

RELATED APPLICATIONS

The present application claims priority to Japanese Patent Application Number 2019-014499 filed on Jan. 30, 2019, the disclosure of which is hereby incorporated by reference herein in its entirety.

BACKGROUND OF THE INVENTION

Field of the Invention

The present invention relates to a control parameter adjustment device.

Description of the Related Art

In a control device that controls a machine tool, a robot or the like, which is used in a factory, a pointing device called a touch panel has been used instead of a mechanical button.

In a touch panel, a contact detection device is attached to a liquid crystal display or the like. The touch panel displays an image expressing an operation, such as a button or a handle, on the liquid crystal display, detects a touch operation on the displayed image expressing the operation, thereby enables entry of information.

There are various types such as a resistor film type, an optical type and the like, as a type of a touch panel. Among others, a capacitance type touch panel that has relatively simple structure and can easily actualize a flat external appearance in a device embedded with the touch panel has been used in many environments.

Such capacitance type touch panel is likely to be affected by noise because of the structure thereof. For example, the capacitive type touch panel may cause a malfunction due to a disturbance noise such as an electromagnetic wave, radiation noise, induced noise or the like generated at processing with a machine tool. Such a malfunction occurs because disturbance noise cannot be distinguished from a signal caused when contact on the capacitance type touch panel by an operator is detected.

A countermeasure against disturbance noise in a capacitance type touch panel may be, for example, a differential detection scheme to acquire a difference of detected signals on touch wirings that are close to or adjacent to each other, a filtering scheme to filter off a high frequency component contained in fluctuations of a detected static capacitance value, or the like (for example, Japanese Patent Application Publication Nos. 2012-094079 and 2016-058047). Furthermore, a frequency hopping scheme to avoid noise by switching scan frequencies is also used as a countermeasure against noise (for example, Japanese Patent Application Publication No. 2016-200886).

In conventional countermeasures against external noise in the capacitance type touch panel, it is necessary to set control parameters, such as input sensitivity, the number of times of filtering or a scan frequency, used in respective schemes. However, setting of control parameters is complex in general, and thus parameter setting at a firmware level is required. It is therefore not easy for a worker operating on site to change nor adjust the control parameter during the operation.

Further, one of the conceivable ways may be to preset control parameters. Even with such presetting, however, know-how is required for setting suitable control parameters taking into consideration of an environment (noise occurrence condition) in which the capacitance type touch panel is used, and there is a problem of difficulty in adjustment.

Accordingly, there is a demand for a control parameter adjustment device for a capacitance type touch panel that adjusts a control parameter on the basis of the condition of external noise in an operating environment of the capacitance type touch panel.

SUMMARY OF THE INVENTION

A control parameter adjustment device according to the present invention generates a learning model by performing machine learning on a suitable control parameter against external noise derived from an operating environment of a capacitance type touch panel, estimates and sets a control parameter that is more suitable for the current environment by using the learning model generated when the capacitance type touch panel is used, and thereby solves the above problem.

A control parameter adjustment device according to the present invention is a device configured to set a control parameter of a capacitance type touch panel device, the control parameter adjustment device comprising: a data acquisitor for acquiring at least data related to a control parameter including a control parameter set for the capacitance type touch panel device and data related to external noise detected when the capacitance type touch panel device is not touched; a pre-processor for, based on the data acquired by the data acquisitor, generating learning data used in machine learning; and a machine learning device for, based on the learning data, performing a machine learning process related to adjustment of the control parameter of the capacitance type touch panel device in an environment in which the data related to the external noise is acquired.

According to the present invention, it is possible to more suitably change and adjust a control parameter depending on influence of noise from an environment when a capacitance type touch panel is used.

BRIEF DESCRIPTION OF THE DRAWINGS

The above-described and other objects and features of the present invention will be apparent upon reading of the following description of embodiments with reference to the accompanying drawings, in which.

DETAILED DESCRIPTION OF THE PREFERRED EMBODIMENTS

Some embodiments of the present invention will be described below with reference to the drawings.

Figure 1:
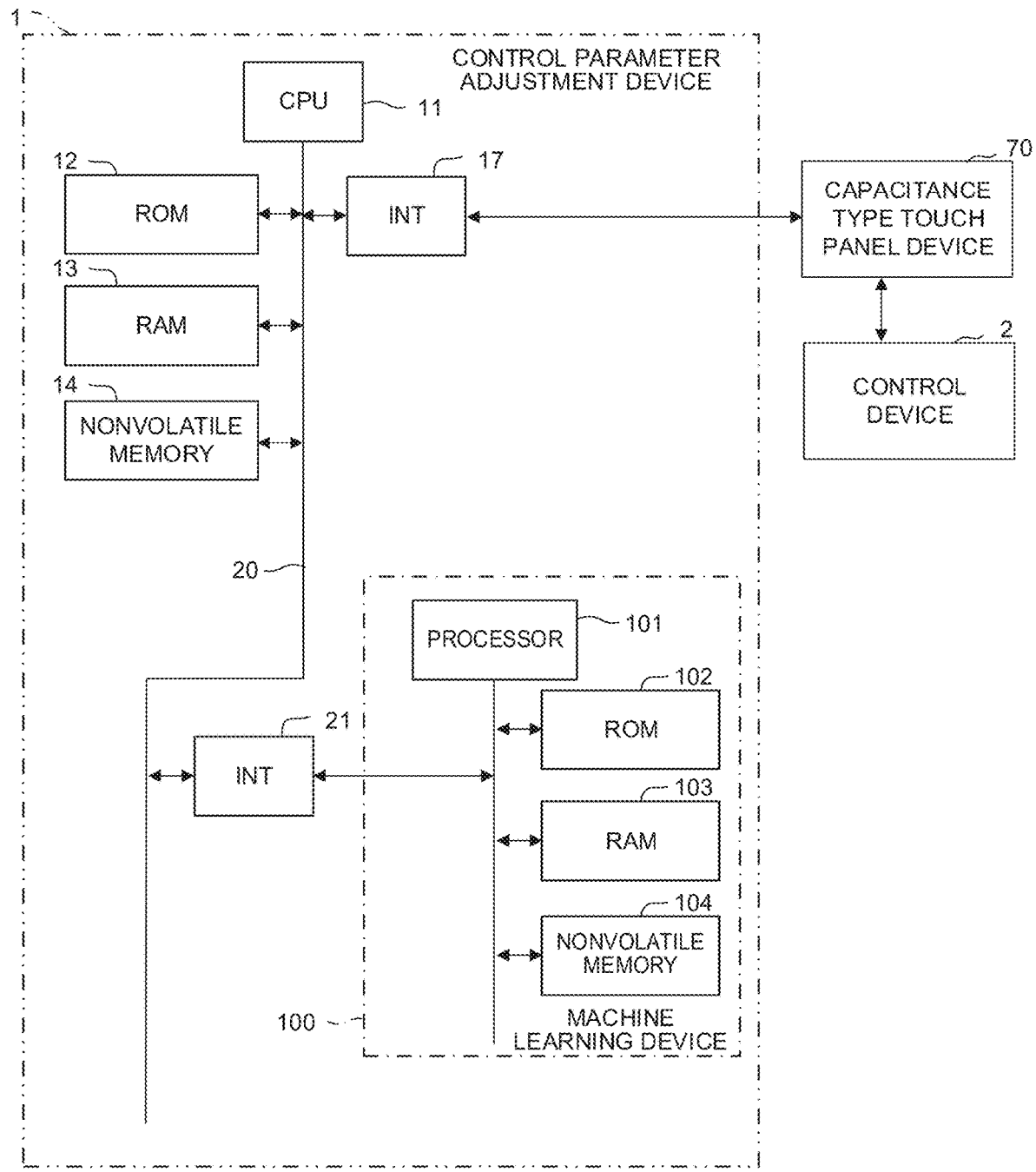
FIG. 1 is a schematic hardware configuration diagram of an embodiment of a control parameter adjustment device in accordance with the invention.

FIG. 1 is a schematic hardware configuration diagram illustrating a primary part for control parameter setting having a machine learning device in an embodiment. A control parameter adjustment device 1 of the present embodiment can be mounted on a control device having a capacitance type touch panel, for example. Further, the control parameter adjustment device 1 of the present embodiment may be mounted as a computer such as a personal computer provided together with a control device having a capacitance type touch panel or a computer such as a management device, an edge computer, a fog computer or a cloud server, connected to the control device via a wired or wireless network.

In the present embodiment, the control parameter adjustment device 1 is mounted on a personal computer provided together with a control device 2 having a capacitance type touch panel device 70.

With reference to FIG. 1, the control parameter adjustment device 1 according to the present embodiment includes a central processing unit (CPU) 11, a read-only memory (ROM) 12, a random access memory (RAM) 13, a nonvolatile memory 14 and interfaces 17 and 21.

The CPU 11 included in the control parameter adjustment device 1 according to the present embodiment is a processor that entirely controls the adjustment device 1. The CPU 11 reads out a system program stored in the ROM 12 via a bus 20 to control the overall adjustment device 1 in accordance with the system program. The RAM 13 temporarily stores temporary calculation data, various data input by a worker via an input device or the like.

The nonvolatile memory 14 may be configured to a memory device, a solid state drive (SSD) or the like, which is backed up by a battery (not shown in the drawings) and so on. Thereby, even when the control parameter adjustment device 1 is powered off, the storage state of the memory 14 is maintained.

The nonvolatile memory 14 stores a setting parameter acquired from a setting region, in which setting information related to the operation of the control parameter adjustment device 1 is stored, and from the capacitance type touch panel device 70. The nonvolatile memory 14 also stores, for example, external noise detected by the touch panel device 70, touch data detected by the touch panel device 70, instruction data output to the touch panel device 70, and data loaded from an external storage (not shown) or another computer via a network.

A program or various data stored in the nonvolatile memory 14 may be loaded into the RAM 13 at the time of execution or use. Further, in the ROM 12, a system program including a known analysis program for analyzing various data, a program for controlling the transaction with a machine learning device 100 described later is written in advance.

The control device 2 is a controller that controls an industry machine (not shown) such as a machine tool and a robot. The control device 2 outputs various displayable information calculated during control of an industry machine and various information detected from an industry machine to the capacitance type touch panel device 70 serving as a display.

Further, the control device 2 displays an image for operation, such as a virtual button and handle, on the capacitance type touch panel device 70 in order to accept a worker's operation required for control of an industry machine. The control device 2 further controls the operation of the control device 2 itself and an industry machine, based on a touch operation performed on the image for operation by the worker, the touch operation being detected by the capacitance type touch panel device 70 serving as an input device.

The control parameter adjustment device 1 may be configured to be able to directly control the display on the capacitance type touch panel device 70 and acquire data from the touch panel device 70, in relation with the touch panel device 70 via the interface 17.

Further, the control parameter adjustment device 1 may be configured to be able to indirectly control the display on the capacitance type touch panel device 70 and acquire data from the touch panel device 70, by transferring data with the control device 2 via an interface (not shown).

The interface 21 is an interface used in connecting the control parameter adjustment device 1 with the machine learning device 100 to each other. The machine learning device 100 includes a processor 101 that integrally controls the overall machine learning device 100, a ROM 102 storing a system program or the like, a RAM 103 for temporary storage in each process related to machine learning and a nonvolatile memory 104 used in storing a learning model or the like.

The machine learning device 100 can survey various information that can be acquired by the control parameter adjustment device 1 via the interface 21. Various information that can be acquired by the adjustment device 1 may be, for example, a setting parameter acquired from the capacitance type touch panel device 70, external noise detected by the touch panel device 70, touch data detected by the touch panel device 70 and instruction data output to the touch panel device 70.

Further, the control parameter adjustment device 1 acquires a process result output from the machine learning device 100 via the interface 21 to store the acquired result therein, display the acquired result thereon and transmit the result to another device via a network or the like.

Figure 2:
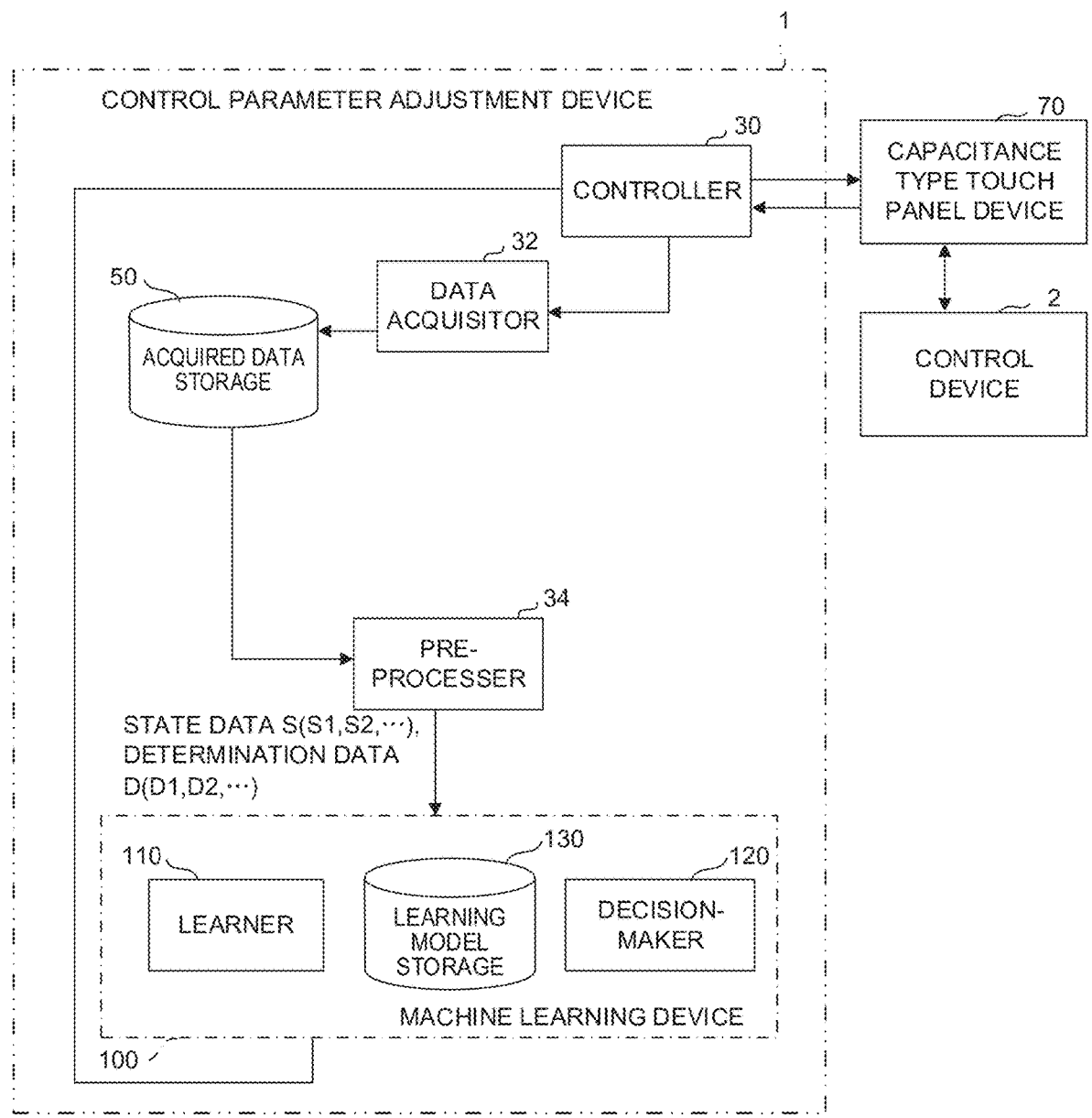
FIG. 2 is a schematic function block diagram of a first embodiment of the adjustment device.

FIG. 2 is a schematic function block diagram of the control parameter adjustment device 1 and the machine learning device 100 in the first embodiment. Each function block shown in FIG. 2 is actualized when the CPU 11 included in the adjustment device 1 and the processor 101 in the machine learning device 100 shown in FIG. 1 execute respective system programs to control the operations of respective components of the adjustment device 1 and the machine learning device 100.

The control parameter adjustment device 1 of the present embodiment includes a controller 30, a data acquisitor 32 and a pre-processor 34. The machine learning device 100 included in the control parameter adjustment device 1 includes a learner 110 and a decision-maker 120.

Further, the nonvolatile memory 14 shown in FIG. 1 has an acquired data storage 50 for storing data acquired from the capacitance type touch panel device 70. The nonvolatile memory 104 in the machine learning device 100 shown in FIG. 1 has a learning model storage 130 for storing a learning model built by machine learning performed by the learner 110.

The controller 30 is a functional unit that performs control on display and input of the capacitance type touch panel device 70, based on a control program stored in the nonvolatile memory 14 shown in FIG. 1. The controller 30 controls the touch panel device 70 so as to operate in a control parameter learning mode at a predetermined timing such as the time of startup of the touch panel device 70, the time of an operation on the touch panel device 70 by a worker, or the like.

When the capacitance type touch panel device 70 operates in the control parameter learning mode, the controller 30 acquires data related to noise detected by the touch panel device 70 in a state where the worker is not performing any operation on the touch panel device 70.

The capacitance type touch panel device 70 is configured to arrange a sensor on a panel of the device 70, the sensor detecting a change in the capacitance occurring between the electrode and, for example, the GND or a worker's finger. By using such sensor as an antenna, the touch panel device 70 can detect disturbance noise in the operating environment. Accordingly, the controller 30 may display a message such as "please do not touch the screen" on the screen to instruct the worker not to perform an operation on the screen of the capacitance type touch panel device 70. When the sensor in the capacitance type touch panel device 70 detects some change in the capacitance even though such instruction is provided, the controller 30 is able to regard this change as noise.

Figure 3:
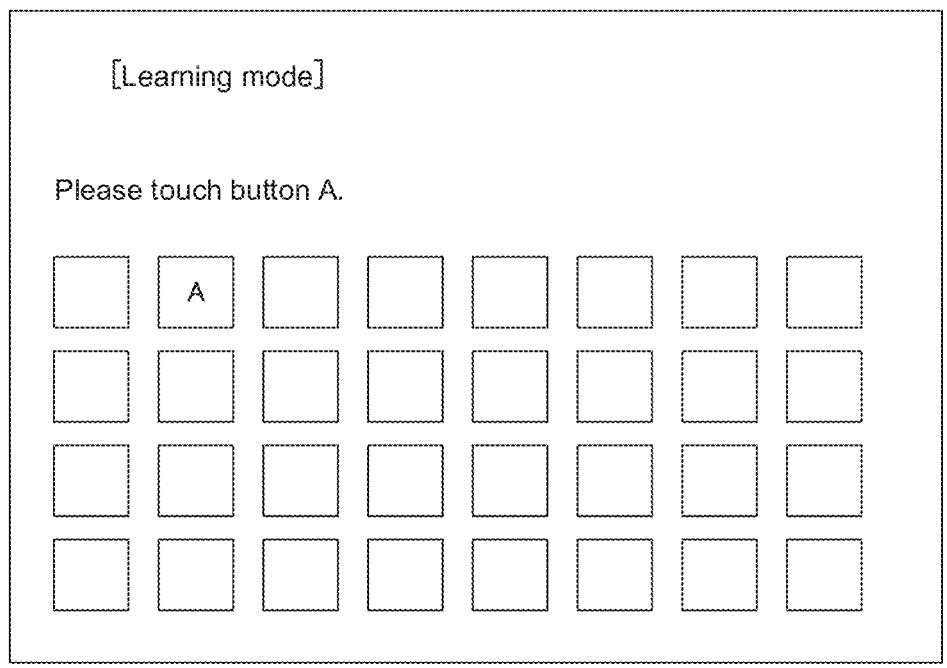
FIG. 3 is a screen display example in acquiring a touch operation performed by a worker.

Further, when the capacitance type touch panel device 70 operates in the control parameter learning mode, the controller 30 displays virtual buttons on the screen, shown in FIG. 3 as an example, and performs display instructing the worker to perform a predetermined operation.

The predetermined operation that the controller 30 prompts the worker to perform may be to perform a touch operation on a predetermined position at a predetermined timing. Further, the predetermined operation may be to sequentially touch a plurality of predetermined positions on the display screen in accordance with a predefined pattern. The controller 30 acquires data as a result detected by the capacitance type touch panel device 70 after providing display that prompts the worker to perform a predetermined operation.

Furthermore, the controller 30 can acquire a control parameter currently set for the capacitance type touch panel device 70. Further, the controller 30 can also set a control parameter for the capacitance type touch panel device 70. The control parameter acquired from or set for the touch panel device 70 by the controller 30 is different in accordance with a control scheme within the touch panel device 70. For example, input sensitivity, the number of times of filtering and a scan frequency may be a control parameter acquired from or set for the touch panel device 70.

The data acquisitor 32 is a functional unit that acquires, from the controller 30, various data detected from the capacitance type touch panel device 70. The data acquisitor 32 acquires, from the controller 30, at least the control parameter set for the touch panel device 70 and data related to disturbance noise in the operating environment of the touch panel device 70. The data acquisitor 32 may further acquire, from the controller 30, instruction data for providing an instruction of a touch operation on the touch panel device, data related to the touch operation detected for the instruction, and the like. The data acquisitor 32 stores data acquired from the controller 30 in the acquired data storage 50.

The pre-processor 34 is a functional unit for creating learning data used in machine learning performed by the machine learning device 100, based on the data acquired by the data acquisitor 32. The pre-processor 34 creates learning data in which the data acquired by the data acquisitor 32 (and then stored in the acquired data storage 50) is converted (such as digitalized or sampled) into a uniform format handled in the machine learning device 100. For example, when the machine learning device 100 performs reinforcement learning, the pre-processor 34 creates, as learning data, a set of state data S and determination data D in a predetermined format in the learning.

The state data S created by the pre-processor 34 in the present embodiment contains at least control parameter data S1 including a control parameter set for the capacitance type touch panel device 70 and noise data S2 including data related to disturbance noise detected by the touch panel device 70 under a condition that the control parameter is set.

The control parameter data S1 may be data obtained by applying the currently set control parameter acquired from the capacitance type touch panel device 70 to a predetermined data sequence that is defined in advance.

The noise data S2 may be data related to disturbance noise detected by the capacitance type touch panel device 70, which may be matrix data in which an element corresponding to a position at which disturbance noise is detected in the touch panel device 70 during a predetermined period is defined as 1, for example.

The determination data D created by the pre-processor 34 is data obtained by determining whether or not the control parameter for a state of disturbance noise is good based on a touch operation detected when an instruction of the touch operation on the touch panel device 70 is provided, in a state where the control parameter corresponding to the control parameter data S1 is set for the capacitance type touch panel device 70 and the noise data S2 is detected. The determination data D includes at least operation determination data D1 based on a difference between an instruction of a touch operation on the touch panel device 70 and a touch operation detected for the instruction.

For example, the operation determination data D1 may be used to determine that the control parameter is "good" when there is a matching between a pattern including the number, the position and the sequence of instructions of touch operations on the capacitance type touch panel device 70 and a pattern including the number, the position and the sequence of touch operations detected for the instructions, and determine that the control parameter is "not good" when there is no matching. A case where "not good" is determined from the operation determination data D1 may be, for example, a case where touch operations at two or more points are detected even with an instruction for a touch operation at one point, a case where a touch operation is detected with a predetermined pattern regardless of an instruction, a case where the entire screen reacts regardless of an instruction and a case where a position other than a position on an instruction reacts.

Further, a degree may be associated with the operation determination data D1, and "not good" may be indicated with a larger degree for a larger difference between the pattern including the number, the position and the sequence of instructions of touch operations on the capacitance type touch panel device 70 and the pattern including the number, the position and the sequence of touch operations detected for the instructions.

The learner 110 performs machine learning using the learning data created by the pre-processor 34. The learner 110 generates a learning model in which adjustment actions of a setting of the control parameter of the touch panel has been learned with respect to disturbance noise in an operating environment of the capacitance type touch panel device 70 by using a known scheme of reinforcement learning. The learner 110 further stores the generated learning model in the learning model storage 130.

The reinforcement learning is a scheme to measure the current state (that is, input) of an environment in which a learning target is present and perform a predetermined action (that is, output) in the current state, repeat a cycle of giving some reward to the action in a try and error manner, and learn a policy as the optimal solution so that the sum of the rewards is maximized. With respect to the machine learning device 100 in the present embodiment, the policy so that the sum of the rewards is maximized may be an adjustment action for the control parameter of the capacitance type touch panel device 70, such as increasing or reducing input sensitivity at a predetermined rate, increasing or reducing the number of times of filtering by a predetermined number of times, or increasing or reducing the scan frequency at a predetermined rate. The scheme of reinforcement learning performed by the learner 110 may be Q-learning or the like.

In the Q-learning performed by the learner 110, a reward R may be a positive (plus) reward R when the operation determination data D1 indicates "good" and may be a negative (minus) reward R when the operation determination data D1 indicates "not good", for example. Further, the reward R may be a larger negative (minus) regard R in accordance with the degree of "not good" indicated by the operation determination data D1.

The learner 110 may be configured to use a neural network as a value function Q (learning model), use state data S and an action a as input of the neural network and further output a value (result y) of the action a in the state. When the learner 11 is configured as above, a neural network having three layers of an input layer, an intermediate layer and an output layer may be used as a learning model. Alternatively, by using a scheme of so-called deep learning using a neural network forming three or more layers, it is possible to configure a learning model so as to perform more effective learning and estimation. The learning model generated by the learner 110 is stored in the learning model storage 130 provided on the nonvolatile memory 104 and is used in an estimation process, performed by the decision-maker 120, for estimating an adjustment action for the control parameter of the capacitance type touch panel device 70.

Note that the learner 110 is an essential component in a learning stage but is not always an essential component after learner 110 completes the learning of an adjustment action for the control parameter of the capacitance type touch panel device 70. For example, when the machine learning device 100 which has completed learning is shipped to a customer, the learner 110 may be removed from the device 100 before shipping.

The decision-maker 120 calculates the optimal solution of an adjustment action for the control parameter of the capacitance type touch panel device 70 using the learning model stored in the learning model storage 130 based on the state data S input from the pre-processor 34. The decision-maker 120 further outputs the calculated action of adjusting the control parameter of the touch panel device 70.

In the decision-maker 120 in the present embodiment, the state data S input from the pre-processor 34 (the control parameter S1, the noise data S2 or the like) and an adjustment action for the control parameter of the capacitance type touch panel device 70 (for example, adjustment of input sensitivity, the number of times of filtering or a scan frequency) are input as input data to the learning model (in which the parameter has been determined) generated by reinforcement learning by the learner 110, and thereby a reward when the action is taken in the current state can be calculated. The decision-maker 120 performs this calculation of the reward on a plurality of adjustment actions for the control parameter of the touch panel device 70 that may be taken at this time. Furthermore, the decision-maker 120 compares a plurality of calculated rewards and estimates, as the optimal solution, an adjustment action for a control parameter of the touch panel device 70 with which the largest reward is calculated.

The optimal solution of an adjustment action for a control parameter of the capacitance type touch panel device 70 estimated by the decision-maker 120 is input to the controller 30 and used in adjustment of a control parameter of the touch panel device 70. In addition, the optimal solution of the adjustment action for the control parameter of the touch panel device 70 may be used by being displayed and output on the touch panel device 70 or transmitted and output to a fog computer, a cloud computer or the like, via a wired or wireless network (not shown).

For example, when the control device 2 starts operating or when a worker operates the capacitance type touch panel device 70, the control parameter adjustment device 1 causes the decision-maker 120 to estimate an adjustment action for the control parameter of the touch panel device 70 at a predetermined cycle during the operation of the touch panel device 70. Thereby, the adjustment device 1 may set a more suitable control parameter for the touch panel device 70 without troubling the worker.

In the control parameter adjustment device 1 having the configuration described above, it is possible to set a more suitable control parameter for the capacitance type touch panel device 70 in accordance with the state of external noise in an operating environment of the capacitance type touch panel device 70. Accordingly, it is expected that the adjustment device 1 reduces erroneous detection of a touch operation.

Figure 4:
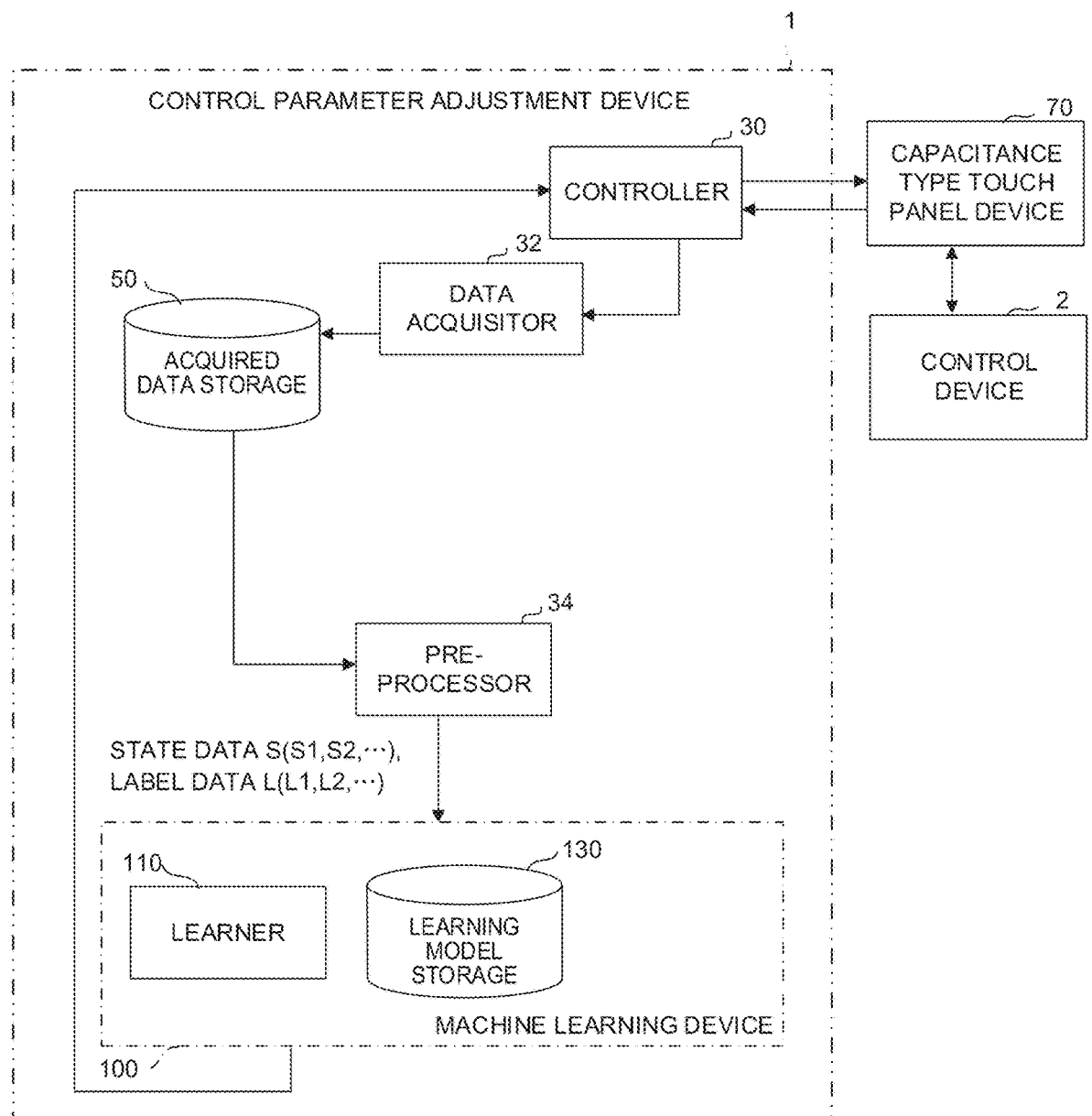
FIG. 4 is a schematic function block diagram of a second embodiment of the adjustment device.

FIG. 4 is a schematic function block diagram of the control parameter adjustment device 1 in a second embodiment and the machine learning device 100 therein. The control parameter adjustment device 1 of the present embodiment has a configuration required when the machine learning device 100 performs supervised learning (learning mode). Each function block shown in FIG. 4 is actualized when the CPU 11 included in the adjustment device 1 and the processor 101 in the machine learning device 100 shown in FIG. 1 execute respective system programs and control the operations of respective components in the adjustment device 1 and the machine learning device 100.

The control parameter adjustment device 1 of the present embodiment includes the controller 30, the data acquisitor 32, and the pre-processor 34. The machine learning device 100 in the control parameter adjustment device 1 includes the learner 110.

Further, the acquired data storage 50 for storing data acquired from the capacitance type touch panel device 70 is provided on the nonvolatile memory 14 shown in FIG. 1. The learning model storage 130 for storing a learning model built by machine learning performed by the learner 110 is provided on the nonvolatile memory 104 in the machine learning device 100 shown in FIG. 1.

The controller 30 and the data acquisitor 32 in the present embodiment have the functions similar to those in the first embodiment. In the present embodiment, the controller 30 repeatedly performs acquisition of data related to noise detected by the capacitance type touch panel device 70 and acquisition of a touch operation detected when an instruction of a touch operation to the touch panel device 70 is provided in a state where the worker does not perform any operation on the touch panel device 70. By performing such repetition, the controller 30 supports the data acquisitor 32 to acquire data used for learning. At this time, while an experienced worker performs adjustment of the control parameter of the touch panel device 70, the worker's operation described above is repeatedly performed.

The pre-processor 34 in the present embodiment is a functional unit for creating learning data used in machine learning performed by the machine learning device 100, on the basis of the data acquired by the data acquisitor 32. The pre-processor 34 creates learning data in which the data acquired by the data acquisitor 32 (and then stored in the acquired data storage 50) is converted (digitalized, sampled or the like) into a uniform format handled in the machine learning device 100. For example, when the machine learning device 100 performs supervised learning, the pre-processor 34 creates, as learning data, a set of state data S and label data L in a predetermined format in the machine learning.

The pre-processor 34 in the present embodiment creates learning data based on acquired data in which the control parameter of the capacitance type touch panel device 70 has been adjusted by an experienced worker out of data acquired by the data acquisitor 32. For example, the pre-processor 34 creates learning data on the basis of acquired data in which a pattern including the number, the position and the sequence of instructions of touch operations on the touch panel device 70 matches a pattern including the number, the position and the sequence of touch operations detected for the instructions out of data acquired by the data acquisitor 32.

The state data S created by the pre-processor 34 in the present embodiment includes at least noise data S2 including data related to disturbance noise detected in the capacitance type touch panel device 70. For example, the noise data S2 may be matrix data in which an element corresponding to a position where disturbance noise is detected on the touch panel device 70 during a predetermined period is defined as the value of 1.

On the contrary, the label data L created by the pre-processor 34 in the present embodiment includes at least control parameter data L1 containing a control parameter set for the capacitance type touch panel device 70. The control parameter data L1 may be data in which a control parameter acquired from the touch panel device 70 is applied to a predetermined data sequence.

The learner 110 in the present embodiment performs machine learning using learning data created by the pre-processor 34. The learner 110 generates a learning model in which adjustment of the control parameter of the capacitance type touch panel has been learned with respect to disturbance noise in an operating environment of the touch panel device 70 by using a known method of supervised learning. The learner 110 further stores the generated learning model in the learning model storage 130.

The method of supervised learning performed by the learner 110 may be a multilayer perceptron method, a recurrent neural network method, a long short-term memory method, a convolutional neural network method or the like.

The learner 110 performs supervised learning, which is based on learning data obtained through the process by the pre-processor 34, on acquired data acquired from the touch panel device 70 when the worker successfully adjusts the control parameter of the capacitance type touch panel device 70. In such a way, the learner 110 can generate a learning model in which the control parameter of the capacitance type touch panel has been learned with respect to disturbance noise in an operating environment of the touch panel device 70.

By using the learning model generated in such a way, an estimator 122 described later can estimate a more suitable control parameter of the capacitance type touch panel device 70 in the acquired state, on the basis of the state data S obtained after the pre-processor 34 processes acquired data acquired from the touch panel device 70.

Figure 5:
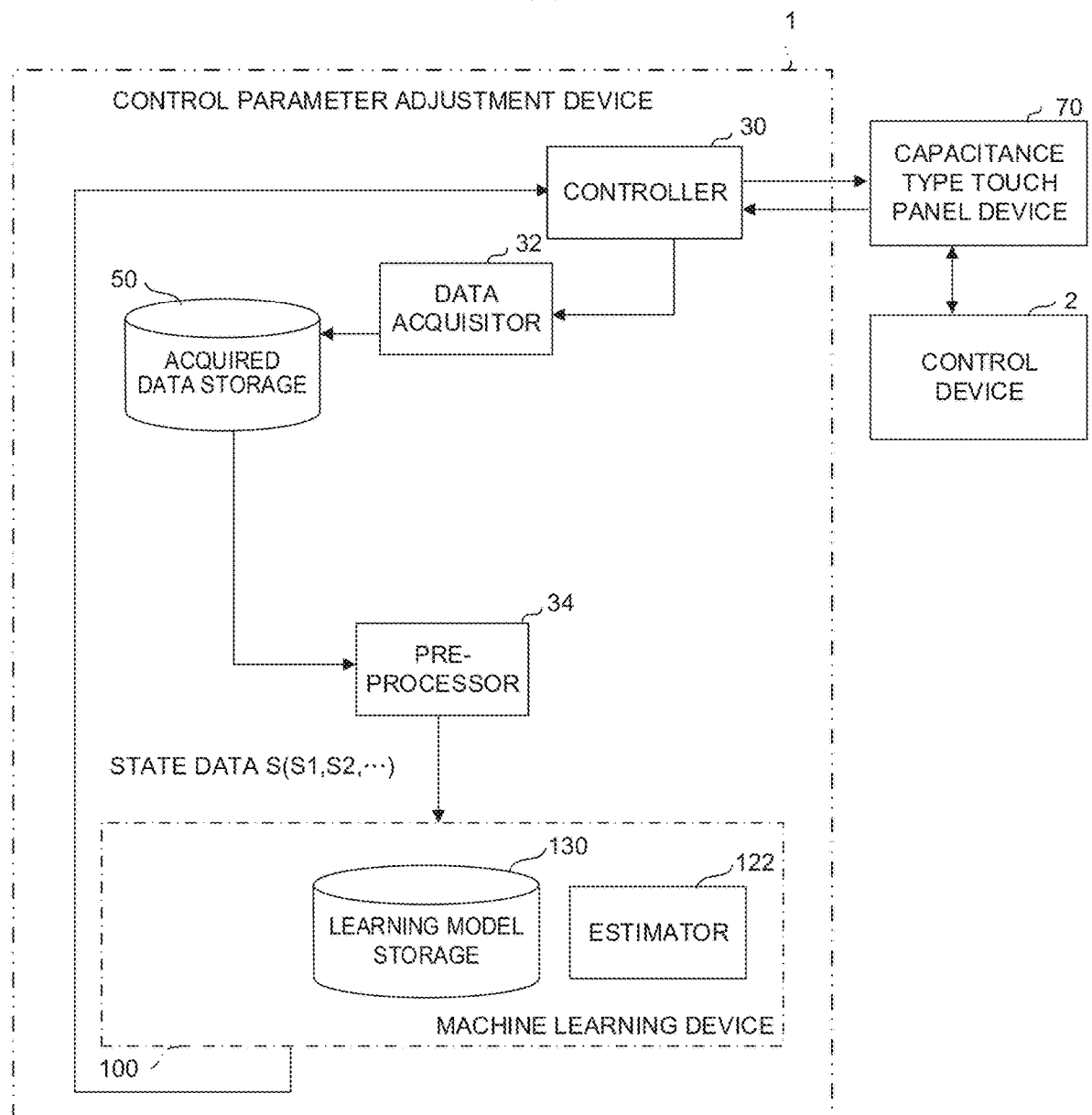
FIG. 5 is a schematic function block diagram of a third embodiment of the adjustment device.

FIG. 5 is a schematic function block diagram of the control parameter adjustment device 1 in a third embodiment and the machine learning device 100 therein. The adjustment device 1 of the present embodiment has a configuration required when the machine learning device 100 estimates the control parameter of the capacitance type touch panel device 70 (estimation mode). Each function block shown in FIG. 5 is actualized when the CPU 11 in the adjustment device 1 and the processor 101 in the machine learning device 100 shown in FIG. 1 execute respective system programs and control the operations of respective components in the adjustment device 1 and the machine learning device 100.

The control parameter adjustment device 1 of the present embodiment includes the controller 30, the data acquisitor 32 and the pre-processor 34. The machine learning device 100 in the control parameter adjustment device 1 includes the estimator 122.

Further, the acquired data storage 50 for storing data acquired from the capacitance type touch panel device 70 is provided on the nonvolatile memory 14 shown in FIG. 1. The learning model storage 130 for storing a learning model derived from machine learning performed by the learner 110, already described in the second embodiment, is provided on the nonvolatile memory 104 in the machine learning device 100 shown in FIG. 1.

The controller 30 and the data acquisitor 32 in the present embodiment have the functions similar to those of the controller 30 and the data acquisitor 32 in the first embodiment. The controller 30 in the present embodiment detects, at a predetermined timing, disturbance noise in an operating environment of the capacitance type touch panel device 70. The predetermined timing to detect the disturbance noise may be, for example, the time when the capacitance type touch panel device 70 starts up, the time when a worker operates the touch panel device 70 to provide an instruction of adjustment of the control parameter, or a predetermined cycle that is defined in advance.

The pre-processor 34 in the present embodiment creates the state data S in a predetermined format for use in estimation performed by the machine learning device 100. More specifically, the pre-processor 34 creates the state data S in a predetermined format by converting (digitalizing, sampling or the like) data acquired by the data acquisitor 32 into a uniform format handled in the machine learning device 100 in a stage where the machine learning device 100 estimates the control parameter of the capacitance type touch panel device 70 using the learning model.

The estimator 122 estimates the control parameter of the capacitance type touch panel device 70 using the learning model stored in the learning model storage 130 based on the state data S created by the pre-processor 34. In the estimator 122 in the present embodiment, the state data S input from the pre-processor 34 is input to the learning model generated by the learner 110 (in which the parameter has been decided), and thereby the control parameter of the touch panel device 70 is estimated and output. The result estimated by the estimator 122 (that is, the control parameter of the touch panel device 70) is output to the controller 30. The controller 30 further sets the control parameter for the touch panel device 70 based on the estimation result.

Although the embodiments of the present invention have been described above, the present invention is not limited to only the examples in the embodiments described above and can be embodied in various forms by adding an appropriate modification.

According to the above-mentioned embodiments, the control parameter adjustment device 1 includes a CPU (processor) and the machine learning device 100 includes another CPU. However, the machine learning device 100 may be actualized by the CPU 11 included in the control parameter adjustment device 1 and a system program stored in the ROM 12.

The invention claimed is:

1. A control parameter adjustment device configured to set a control parameter of a capacitance type touch panel device, the control parameter adjustment device comprising:
   a data acquisitor configured to acquire at least
      data related to a control parameter including a control parameter set for the capacitance type touch panel device, and
      data related to external noise detected when the capacitance type touch panel device is not touched, the external noise being a disturbance noise to the capacitance type touch panel device and including at least one of an electromagnetic wave, radiation noise, or induced noise;
   a pre-processor configured to, based on the data acquired by the data acquisitor, generate learning data used in machine learning; and
   a machine learning device configured to, based on the learning data, perform a machine learning process related to adjustment of the control parameter of the capacitance type touch panel device in an environment in which the data related to the external noise is acquired.

2. The control parameter adjustment device according to claim 1, wherein
   the data acquisitor is further configured to acquire
      instruction data including an instruction of a touch operation on the capacitance type touch panel device, and
      operation data detected in response to a touch to the capacitance type touch panel device,
   the pre-processor is configured to generate, as the learning data,
      state data based
         on data related to the control parameter, and
         on data related to the external noise, and
      determination data based on the instruction data and the operation data, and
      wherein
   the machine learning device comprises a learner configured to, based on the learning data, generate a learning model by performing reinforcement learning on adjustment of the control parameter of the capacitance type touch panel device in the environment in which the data related to the external noise is acquired.

3. The control parameter adjustment device according to claim 1, wherein
   the pre-processor is configured to generate state data based
      on data related to the control parameter and
      on data related to the external noise, and
   the machine learning device comprises:
      a learning model storage configured to store a learning model generated by reinforcement learning performed on an adjustment action for the control parameter of the capacitance type touch panel device in the environment in which the data related to the external noise is acquired, and
      a decision-maker configured to, based on the state data, decide an adjustment action for the control parameter of the capacitance type touch panel device using the learning model.

4. The control parameter adjustment device according to claim 1, wherein
   the pre-processor is configured to generate, as the learning data,
      state data based on the data related to the external noise, and
      label data based on data related to the control parameter, and
   the machine learning device comprises a learner configured to, based on the learning data, generate a learning model by performing supervised learning on adjustment of the control parameter of the capacitance type touch panel device in the environment in which the data related to the external noise is acquired.

5. A control parameter adjustment device configured to set a control parameter of a capacitance type touch panel device, the control parameter adjustment device comprising:
   a data acquisitor for acquiring at least
      data related to a control parameter including a control parameter set for the capacitance type touch panel device and
      data related to external noise detected when the capacitance type touch panel device is not touched;
   a pre-processor for, based on the data acquired by the data acquisitor, generating learning data used in machine learning; and
   a machine learning device for, based on the learning data, performing a machine learning process related to adjustment of the control parameter of the capacitance type touch panel device in an environment in which the data related to the external noise is acquired, wherein
   the pre-processor generates state data based on the data related to the external noise, and wherein
   the machine learning device comprises:
      a learning model storage for storing a learning model generated by performing supervised learning on an adjustment action for the control parameter of the capacitance type touch panel device in the environment in which the data related to the external noise is acquired, and
      an estimator for, based on the state data, estimating adjustment of the control parameter of the capacitance type touch panel device by using the learning model.

6. The control parameter adjustment device according to claim 1, wherein the data related to the external noise acquired by the data acquisitor is data obtained using a sensor of the capacitance type touch panel device as an antenna, in response to a detection of a change in a capacitance due to external noise.

7. The control parameter adjustment device according to claim 2, wherein the determination data indicate
   that the control parameter is "good" in response to a matching between
      a first pattern including a number, a position and a sequence of instructions of touch operations on the capacitance type touch panel device, and
      a second pattern including the number, the position and the sequence of touch operations detected for the instructions, and
   that the control parameter is "not good" in response to no matching between the first pattern and the second pattern.

8. The control parameter adjustment device according to claim 7, wherein a degree is associated with the determination data, and "not good" is indicated with a larger degree for a larger difference between the first pattern and the second pattern.

* * * * *